(12) United States Patent
Fanning

(10) Patent No.: US 7,352,681 B1
(45) Date of Patent: Apr. 1, 2008

(54) OPTICAL DISC FOR DATA STORAGE WITH INVISIBLE TRACKS AND METHOD OF MAKING SAME

(75) Inventor: Jay Brian Fanning, Wenonan, NJ (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 1826 days.

(21) Appl. No.: 09/178,508

(22) Filed: Oct. 26, 1998

(51) Int. Cl.
*G11B 7/24* (2006.01)

(52) U.S. Cl. .................. 369/275.3; 369/275.4

(58) Field of Classification Search ............. 369/44.29, 369/275.3, 275.4; *G11B 7/24*
See application file for complete search history.

(56) References Cited

U.S. PATENT DOCUMENTS

| | | | | |
|---|---|---|---|---|
| 3,914,793 A | * | 10/1975 | Burnham | 360/77.12 X |
| 3,963,862 A | * | 6/1976 | Bouwhuis | 386/126 |
| RE29,057 E | * | 11/1976 | Enikeieff et al. | 340/149 A |
| 4,161,753 A | * | 7/1979 | Bailey et al. | 386/125 X |
| 4,205,338 A | * | 5/1980 | Schaefer | 386/125 X |
| 4,227,213 A | * | 10/1980 | Isobe | 360/19 X |
| 4,325,135 A | * | 4/1982 | Dil et al. | 369/109 X |
| 4,359,750 A | * | 11/1982 | Howe | 369/275.4 |
| 4,423,497 A | * | 12/1983 | Sugiyama et al. | 386/125 |
| 4,547,876 A | * | 10/1985 | Ettenberg | 369/275.3 |
| 5,138,594 A | * | 8/1992 | Fennema et al. | 369/44.29 |
| 5,293,565 A | * | 3/1994 | Jaquette et al. | 369/32 |
| 5,682,471 A | * | 10/1997 | Billings et al. | 395/182.13 |
| 5,745,459 A | * | 4/1998 | Inokuchi et al. | 369/58 X |
| 5,953,744 A | * | 9/1999 | Marasco | 711/162 |
| 5,959,948 A | * | 9/1999 | Oshima | 369/32 |
| 6,085,318 A | * | 7/2000 | Vander Kamp et al. | 711/1 |

FOREIGN PATENT DOCUMENTS

WO          WO-9516990       *   6/1995

* cited by examiner

*Primary Examiner*—A M Psitos
(74) *Attorney, Agent, or Firm*—Rader Fishman & Grauer PLLC; Ronald P. Kananen

(57) ABSTRACT

An optical disc and a method of making the same are provided in which the tracks on the disc are not numbered in strict numeric sequence. For example, a disc may contain only odd or only even numbered tracks, or tracks numbered 11 to 20. This is accomplished by providing invisible tracks in the positions of the tracks missing from the listing. Invisible tracks are of minimal length such that the invisible tracks are counted by a disc playing device, but will seem to a listener to be missing when the device plays the disc.

11 Claims, 2 Drawing Sheets

Fig. 2

| Track T-X | Track or Index Content | ISRC-Code and Pre-Emphasis | Playing-RIT Time MM SS FF | TXP | SMPTE-Ref. MM SS FF |
|---|---|---|---|---|---|
| 01-00<br>01-01 | SONG ONE | USSM19703320<br>No pre-emph | 00 02 00<br>03 50 18 | P<br>T | 01 57 10<br>01 59 10 |
| 02-00<br>02-01 | SONG TWO | USSM19703314<br>No pre-emph | 00 00 00<br>04 22 24 | P<br>T | 05 49 28<br>05 49 28 |
| 03-00<br>03-01 | SONG THREE | USSM19703313<br>No pre-emph | 00 00 00<br>02 55 28 | P<br>T | 10 12 22<br>10 12 22 |
| 04-00<br>04-01 | Pause | No ISRC Code<br>No pre-emph | 00 00 00<br>00 00 02 | P<br>T | 13 08 20<br>13 08 20 |
| 05-00<br>05-01 | SONG FOUR | No ISRC Code<br>No pre-emph | 00 00 00<br>06 28 02 | P<br>T | 13 08 22<br>13 09 23 |
| 06-00<br>06-01 | Pause | No ISRC Code<br>No pre-emph | 00 00 00<br>00 00 02 | P<br>T | 19 37 25<br>19 37 25 |
| 07-00<br>07-01 | SONG FIVE | No ISRC Code<br>No pre-emph | 00 00 00<br>02 59 02 | P<br>T | 19 37 27<br>19 37 27 |
| 08-00<br>08-01 | Pause | No ISRC Code<br>No pre-emph | 00 00 00<br>00 00 02 | P<br>T | 22 36 29<br>22 36 29 |
| 09-00<br>09-01 | Pause | No ISRC Code<br>No pre-emph | 00 00 00<br>00 00 02 | P<br>T | 22 37 01<br>22 37 01 |
| 10-00<br>10-01 | Pause | No ISRC Code<br>No pre-emph | 00 00 00<br>00 00 02 | P<br>T | 22 37 03<br>22 37 03 |
| 11-00<br>11-01 | SONG SIX | No ISRC Code<br>No pre-emph | 00 00 00<br>02 51 19 | P<br>T | 22 37 05<br>22 37 05 |
|  |  |  |  |  |  |
|  | Start LEAD-OUT<br>Total Program |  | 23 29 14 |  | 25 28 24 |

OPTICAL DISC FOR DATA STORAGE WITH INVISIBLE TRACKS AND METHOD OF MAKING SAME

FIELD OF THE INVENTION

The present invention relates to the field of data storage using optical discs. More particularly, the present invention relates to an optical disc for storing data on which there are one or more short tracks which are so short as to be initially counted, but which appear to be missing when a disc player reads the disc. These invisible tracks thereby change the apparent numbering of the longer or visible tracks during playback.

BACKGROUND OF THE INVENTION

As the speed and capability of computers and computer driven systems has constantly increased in modern times, so has the need for data storage devices on which information can be more compactly and densely stored. Previously, the best data storage media were magnetic, for example, magnetic tape or magnetic floppy discs.

In a magnetic data storage device, such as an audio cassette tape or a video tape, different portions of the tape are magnetized differently to represent the data being stored on the tape. When the data is to be retrieved, the tape is drawn across a magnetic head that senses the variations in the magnetization of the tape. These variations are read by the tape player and converted into the data stored on the tape. The player may then reproduce the data stored on the tape as, for example, an audiovisual program, such as a movie, or an audio program, such as a piece of music.

Magnetic storage devices have been used for storing music (e.g., cassette and eight-track tapes), television programming and movies (e.g., video tapes) and computer programs or program files (e.g., floppy discs). However, in more recent times optical discs have begun to replace magnetic data storage devices in all these area.

For example, the highest quality music is now recorded on and played from compact discs (CDs). Digital video discs (DVDs) provide a better quality video recording for movies and other audiovisual programming. CD-ROM discs provide programming for computers and, where the CD-ROM is writable, storage of computer files. Optical discs provide a digital data storage medium that allows a greater amount of data to be stored on a smaller device than was possible with magnetic data storage devices.

With an optical disc, information is stored by altering the reflectivity of successive points on the disc. To read the disc, a tightly focused laser bean is aimed at the disc. As the disc spins, the laser will pass over the different points on the disc which are arranged in a spiral. Some points will reflect the laser light back to the player; others will not reflect the light.

The disc player includes a light detector that will sense when the laser is and is not reflected. These two different possibilities, reflection—no reflection, are used to store data on the disc in a binary, digital format.

In an audio compact disc or CD, for example, data is organized into tracks. Each track consists of a sequence of reflective and non-reflective points on the disc which, when read by a CD player, can be reproduced as a song or other musical piece. The tracks on the CD are always numbered sequentially with no breaks in the numbering between one and the highest numbered track on the disc.

For example, when the CD is first inserted in a CD player, the player will typically make a quick scan of the disc to determine the total number of tracks and the total amount of time it would require to play all the music on the CD. These two pieces of information are then displayed, usually on the LCD or other display of the CD player. If the CD player is part of a computer system, a listing of the tracks may be provided on the computer monitor.

Then, as the user listens to the CD, the CD player usually displays the number of the track corresponding to the song or musical piece being played in relation to the other tracks on the disc. A great advantage of the CD format is that the CD player can quickly jump between tracks to allow the listener to hear the tracks in any order or to hear only certain tracks in a pre-programmed sequence.

However, even given this great flexibility, tracks on a CD are always sequentially numbered, e.g. 1 to 15, if there are 15 different music pieces recorded on the disc. This unbroken, sequential numbering of the tracks may, however, not be the most optimal numbering.

For example, if a particular CD is one of several in a set, it may be desirable to give each track in the set its own number. For example, it may be advantageous for the first CD in the set to have tracks 1 to 15. The second CD in the set may have tracks 16 to 30, and so on.

If this were possible, it might be easier for a listener to distinguish between the discs in the set and to reference a printed listing of the tracks on the discs so as to more readily locate a particular musical piece the listener wishes to hear. This may be particularly advantageous where several discs are in the disc player at one time such as on a turntable, or where the discs in the set are stored together in a magazine or cartridge which is fed to the CD player. With such a multi-disc player, the discs themselves are not typically viewed by the user once they are in the player or in the multi-disc cartridge. Therefore distinguishing between the discs would become easier if each disc had tracks numbered in a different range.

Additionally, an artist for artistic reasons may wish to number the tracks on a CD is some manner other than in an unbroken, numeric sequence. For example, it may be interesting to have only even or only odd numbered tracks on a CD for purely artistic reasons.

In the past, however, there has been no way to accomplish these objectives. All known optical discs and disc players organize the tracks with an unbroken, sequential numbering. Therefore, there is a need in the art for an optical disc and a method of making the same on which the tracks of the disc may be flexibly numbered in a manner other than in an unbroken, numeric sequence.

SUMMARY OF THE INVENTION

Consequently, it is an object of the present invention to meet the above-described needs and others. Specifically, it is an object of the present invention to provide an optical disc and a method of making the same which, when read by a disc player will exhibit tracks which are not numbered in an unbroken, numeric sequence.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects, the present invention may be embodied and described as an optical disc having tracks thereon with at least one invisible track, and at least one visible track having data content. An invisible track is a track with a minimal length such that the invisible track is initially counted, but not perceptibly acknowledged by a device while reading the optical disc. The invisible track is preferably only one or two frames in length.

To achieve a particular desired numbering of the tracks, the at least one invisible track may be a plurality of invisible tracks which are grouped together on the optical disc, for example at the beginning of the data stored on the disc. Alternatively, the at least one invisible track may be two or more invisible tracks which are interspersed with two or more visible tracks.

The present invention also encompasses a method of making the optical disc described above. The method of the present invention may be described as a method of making an optical disc on which tracks recognized by a a disc player are not numbered in unbroken, numeric sequence beginning with one. The method includes the step of providing at least one invisible track on the disc.

The step of providing at least one invisible track is accomplished by providing a track of minimal length such that the track is initially counted but appears to be missing when the disc player plays the disc. As before, this is preferably accomplished by providing a track with a length of only one or two frames.

To produce the desired numbering effect, the method of the present invention may include providing two or more invisible tracks on the disc interspersed with two or more visible tracks. Alternatively or additionally, the method may include providing two or more invisible tracks grouped together on the disc.

BRIEF DESCRIPTION OF THE DRAWINGS

The accompanying drawings illustrate the present invention and are a part of the specification. Together with the following description, the drawings demonstrate and explain the principles of the present invention.

FIG. 2 is table representing the tracks on a compact disc according to the present invention where songs are provided only on those tracks that are numbered with a prime number.

DETAILED DESCRIPTION OF THE PREFERRED EMBODIMENTS

Figure 1:
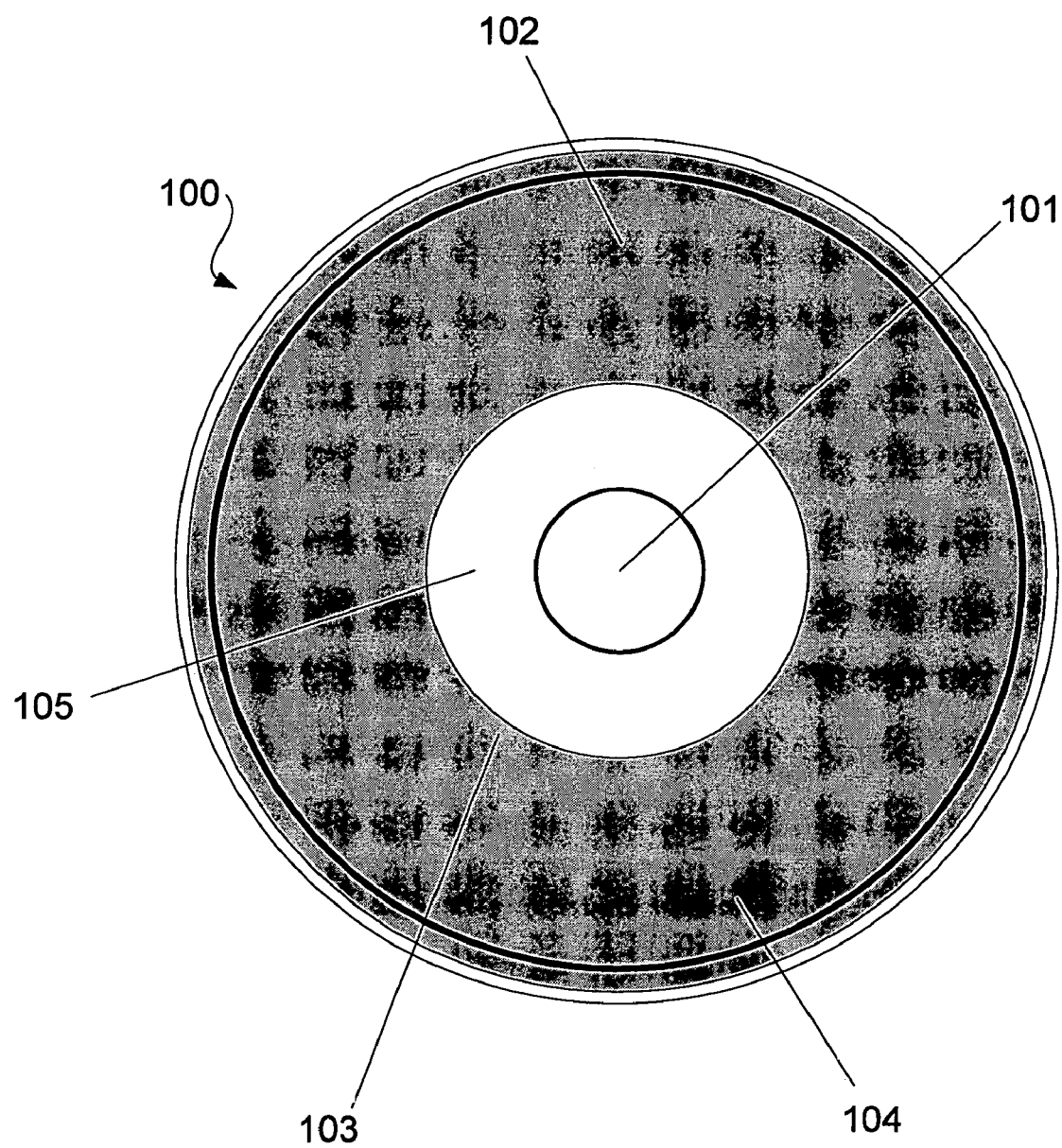
FIG. 1 is an illustration of a compact disc according to the principles of the present invention.

Stated in broad principle, the present invention includes the idea that invisible tracks can be placed on an optical disc so as to cause the visible tracks to have a numbering which is not an unbroken numeric sequence or which does not begin with the number one. An invisible track is a track of minimal length such that when a disc player attempts to read the disc, the invisible track will be initially counted as the number of tracks on the disc is totaled for display, but will have no actual content. The track is thus present, but invisible to the disc player, meaning that the disc player, while playing the disc, will read the invisible track so quickly that no listing or recognition of the track will be displayed by the player or be otherwise perceptible to someone using the player.

In this way, invisible tracks can proceed or be interspersed with the visible tracks that contain the actual data content of the disc. With invisible tracks provided on the disc, the visible tracks can be placed so as to be numbered other than in strict sequential order.

For example, all the odd tracks may be invisible tracks. Thus, the disc will appear to have only evenly numbered tracks. Alternatively, the second disc in a two-disc set may have ten invisible tracks at the beginning of the disc so that the visible tracks with content are numbered upward from eleven. Presumably, the first disc in the set would contain only ten normally numbered tracks. In this way, the two discs in the set are easily distinguished even when already inserted in a disc player.

FIG. 1. illustrates an audio compact disc according to the present invention. The disc (100) of the present invention includes a data storage portion (102), a clear plastic portion (105) and a center hole (101). The reflective and non-reflective points on the disc are arranged as tracks in a tight spiral on the data storage portion (102) of the disc (100). The center hole (101) serves to mount the disc in a protective case (not shown) or in a disc player (not shown). The clear plastic portion (105) provides a buffer zone between the data storage portion (102) and the center hole (101) with which the disc is mounted.

Disc (100) includes an invisible track (103) and a visible track (104). As noted above, the invisible track is of minimal length. Tracks are measured by the time required to play them, e.g., minutes and seconds. Below the one-second level, track length is measured in frames. 30 frames equal one second, or one frame equals $\frac{1}{30}^{th}$ of a second.

For a track to be invisible it may be, for example, only one or two frames long. Such a track will be initially counted in the total number of tracks on the disc, but will appear to be missing when the disc player actually plays the disc.

FIG. 2 is a table that illustrates a compact disc having eleven tracks where, for artistic reasons, musical pieces are located only on tracks numbered with a prime number. The first column of the table of FIG. 2 lists the numbers of the eleven tracks. The second code lists the track content.

The third column lists the ISRC code for each track and any pre-emphasis information provided. "ISRC" is an abbreviation for the International Standard Recording Code. An ISRC is encoded into every manufactured compact disc. It contains information about the country of origin, the owner, the year of recording and the serial number of a recording.

The fourth column lists the playing time of the track in minutes, seconds and frames. The fifth and sixth columns list, respectively, TXP and the SMPTE-Reference in minutes, second and frames for each track.

Thus, as shown in the table of FIG. 2, the audio CD represented has eleven actual tracks with only tracks numbered with a prime number being visible tracks. Specifically, tracks 1 to 3 (one, two and three being prime numbers) contain, respectively, SONG ONE, SONG TWO and SONG THREE. The track for SONG ONE, for example, has a length of 3 minutes, 50 seconds and 18 frames as shown in the "Playing-RIT Time" column. The tracks for SONG TWO and SONG THREE have, respectively, approximately 4.5 and 3 minutes of content.

Four, however, is not a prime number. Therefore, track 4 is an invisible track with a length of only two frames. Continuing with this pattern, track 5 contains SONG FOUR. Track 6 is invisible with a length of only two frames. Tack 7 contains SONG FIVE. Tracks 8, 9 and 10 are invisible with a length of two frames each. Finally, track 11 contains SONG SIX. In this way, the present invention can be used to achieve a compact disc with tracks that appear to be numbered with only the prime numbers.

The present invention also encompasses the method of making an optical disc with one or more invisible tracks. If an optical disc, such as a compact disc, is to be mass-produced, the creation of short, invisible tracks according to the present invention is accomplished prior to the production of the master from which the compact discs will be mass-produced. At the pre-mastering stage, the creation of invisible tracks can be done with a PQ subcode editor.

Typically an audio program, such as piece of music, which is going to be mass-produced on compact disc, is initially recorded on high fidelity digital tape. This tape, known as mastertape, contains the PQ subcode for the recording and can be edited with a PQ subcode editor. The PQ subcode editor can be used by one skilled in the art, who is informed by the present invention, to insert short, invisible tracks as desired. The digital tape is then used to make a master from which compact discs can be mass-produced.

The preceding examples have explained the present invention primarily in the context of audio compact discs. Audio compact discs are typically organized into tracks and, therefore, provide a principal application for the present invention. However, the present invention is not so limited and may be applied to any optical disc storing data where the data is organized into numbered tracks.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An optical disc having tracks thereon comprising:
   at least one invisible track; and
   at least one visible track having data content,
   wherein said at least one invisible track comprises a plurality of invisible tracks which are placed together at a beginning of data stored on said disc.

2. An optical disc having tracks thereon comprising:
   at least one invisible track; and
   at least one visible track having data content,
   wherein said at least one invisible track comprises a plurality of invisible tracks and said at least one visible track comprises a plurality of visible tracks, and
   wherein said visible and invisible tracks are interspersed with each other.

3. An optical disc having tracks thereon comprising at least one track of a first type, wherein a track of said first type is a track with a minimal length such that said track of the first type is initially counted, but appears to be missing when a disc player plays said optical disc.

4. An optical disc as claimed in claim 3, further comprising at least one track of a second type which has data content and is listed by said device while reading said optical disc.

5. An optical disc as claimed in claim 4, wherein said disc has a plurality of tracks of both said first and second types interspersed with each other.

6. An optical disc as claimed in claim 4, wherein said disc has a plurality of tracks of both said first and second types wherein said plurality of tracks of said first type are grouped together on said disc and said plurality of tracks of said second type are grouped together on said disc.

7. A method of making an optical disc on which tracks recognized by a disc player are not numbered in unbroken, numeric sequence beginning with one, the method comprising providing at least one invisible track on said disc.

8. A method as claimed in claim 7, further comprising providing a plurality of invisible tracks on said disc interspersed with a plurality of visible tracks.

9. A method as claimed in claim 7, further comprising providing a plurality of invisible tracks grouped together on said disc.

10. A method as claimed in claim 7, wherein said providing at least one invisible track comprises providing a track of minimal length such that said track is initially counted but does not appear while said disc player is playing said disc.

11. A method as claimed in claim 7, wherein said providing at least one invisible track comprises providing a track with a length of only one or two frames.

* * * * *